United States Patent [19]
Swaybill et al.

[11] Patent Number: 5,862,887
[45] Date of Patent: *Jan. 26, 1999

[54] HIGH PERFORMANCE LINEAR INDUCTION MOTOR DOOR OPERATOR

[75] Inventors: Bruce P. Swaybill; William L. King; Thomas M. Kowalczyk, all of Farmington; Richard E. Kulak, Bristol; Michael J. Tracey, Cromwell; K. Narasimha Reddy, Bolton; James A. Rivera, Bristol, all of Conn.

[73] Assignee: Otis Elevator Company, Farmington, Conn.

[ * ] Notice: The term of this patent shall not extend beyond the expiration date of Pat. No. 5,756,946.

[21] Appl. No.: 746,281

[22] Filed: Nov. 7, 1996

[51] Int. Cl.$^6$ ...................................................... B66B 13/08
[52] U.S. Cl. ............................................ 187/313; 187/316
[58] Field of Search ..................................... 187/313, 314, 187/315, 316

[56] References Cited

U.S. PATENT DOCUMENTS

| | | | |
|---|---|---|---|
| 1,881,014 | 10/1932 | Ayers . | |
| 1,881,016 | 10/1932 | Rose . | |
| 1,881,017 | 10/1932 | Jacobson . | |
| 1,916,491 | 7/1933 | Rose . | |
| 4,698,876 | 10/1987 | Karita | 16/102 |
| 4,876,765 | 10/1989 | Karita | 16/102 |
| 5,134,323 | 7/1992 | Sakagami et al. | 310/12 |
| 5,172,518 | 12/1992 | Yoshino | 49/360 |
| 5,373,120 | 12/1994 | Barrett et al. | 187/316 |
| 5,668,355 | 9/1997 | Jaminet et al. | 187/315 |
| 5,756,946 | 5/1998 | Tracey et al. | 187/313 |

FOREIGN PATENT DOCUMENTS

| | | |
|---|---|---|
| 29613605U1 | 11/1996 | Germany . |
| 03264486 | 11/1991 | Japan . |
| 541766 | of 0000 | U.S.S.R. . |
| 1406316 | 9/1975 | United Kingdom . |

OTHER PUBLICATIONS

EPC Search Report for Serial No. 97308731.5–2313 dated Feb. 12, 1998.

U.S. Patent Application Serial No. 8/225,024 filed Apr. 8, 1994 entitled "Linear Induction Motor Door Drive Assembly for Elevators"; Jerome F. Jaminet, et al.

*Primary Examiner*—Karen M. Young
*Assistant Examiner*—Gregory A. Moore

[57] ABSTRACT

An elevator car door system for opening and closing elevator car doors in an elevator car includes a high performance linear induction motor having a pair of movable motor primaries, each attached to a door hanger for each door, and a stationary motor secondary attached to a header bracket which is secured to the elevator car. Each motor primary includes a primary winding and a backiron spaced apart by a plurality of spacers that establish a magnetic gap therebetween. The motor secondary fits between the primary winding and the backiron as the moving motor primaries travel across the motor secondary, generating thrust.

5 Claims, 2 Drawing Sheets

HIGH PERFORMANCE LINEAR INDUCTION MOTOR DOOR OPERATOR

CROSS-REFERENCE TO RELATED APPLICATIONS

This application is related to commonly owned applications filed on the same day herewith having Ser. Nos.: 08/746,276, 08/746,275, now U.S. Pat. No. 5,756,046 and Ser. No. 08/746,274, now abandoned.

TECHNICAL FIELD

The present invention relates to elevator systems and, more particularly, to high performance linear induction motors driving elevator car doors therefor.

BACKGROUND OF THE INVENTION

Many considerations play a role in the selection of a system to drive elevator car doors in an elevator. One major constraint in elevators is space. The first space limitation is the length of the door system. The door operating system has to fit within the hoistway and thus, cannot exceed the width of the elevator car, which is frequently referred to as the elevator envelope. The second space limitation is the thickness of the door operating system. The door operating system has to be sufficiently narrow not to interfere with the hoistway as the elevator car travels up and down the hoistway. If the door system is too large and cannot fit between the elevator car and the hoistway, the door system will encroach on the elevator car space. An alternative to encroaching on elevator car space is to mount the door operating system on top of the elevator car. However, such a solution would invite other problems such as an increase in door rocking, restriction of overhead running clearance, and limited access to the car top. Therefore, the door operating system should not enlarge the car door envelope and should be sufficiently narrow not to interfere with the hoistway.

Another major consideration in selecting the elevator car door operating system is the cost of the system and the cost of maintaining and servicing the system. The size of the motor determines the cost of each unit. Also, the tight tolerancing required for some motor configurations increases the cost by demanding expensive precision manufacturing.

An additional constraint in the selection of the door operating system is weight. Since the door operating system is mounted directly on the elevator car and travels therewith, the door operating system should not be excessively heavy.

Once the door operating system meets the space, cost, and weight limitations, it must have a certain level of performance. The opening and closing of the elevator car doors must be simultaneous, smooth, and quiet.

In conventional elevator systems, elevator car doors are selectively opened and closed by a rotary electric motor driving a mechanical assembly, which typically includes a plurality of moving parts such as gear boxes, a set of drive arms, linkages and cams. The major drawback of the existing elevator car door system is that it is susceptible to misalignments and requires frequent adjustments that result in high maintenance costs. Also, the misalignments degrade the performance of the system such that door opening and closing functions are not consistently smooth.

An alternative to the existing mechanical door system is the linear motor driven door system. Although a number of patents have disclosed the use of linear motors on doors, implementation of linear motors in door systems in general, and in elevator car door systems specifically, has been very limited. Most of the existing patents have significant shortcomings and are not practical because they violate either space, cost, or weight constraints, or a combination thereof.

For example, U.S. Pat. No. 1,881,016 to Rose issued on Oct. 4, 1932 and entitled "Door Operating Mechanism" shows a door system driven by an induction motor. The patent teaches a motor secondary attached to one door and a motor primary attached to the second door. The major shortcoming of the disclosed configuration is that the excessively long motor secondary is free hanging and cannot be supported. Additionally, the unsupported motor secondary may buckle when compressed during the door opening function. Thus, the Rose patent does not provide a practical alternative to the existing door systems.

U.S. Pat. No. 1,881,014 to Ayers issued on Oct. 4, 1932 and entitled "Supporting and Operating Means for Doors" shows a door system with motor secondary attached to a door, and moving therewith, and a stationary motor primary. One major drawback of the disclosed configuration is that since the moving motor secondary overhangs the door on both sides, the door opening envelope is significantly enlarged. Therefore, the Ayers disclosure also does not represent a practical solution for modern elevator door systems.

A more recent U.S. Pat. No. 5,172,518 issued on Dec. 22, 1992 to Yoshino discloses an apparatus for doors using a linear motor. The patent shows two U-shaped motor primaries attached to a single door and a T-shaped motor secondary. One major reason for the disclosed configuration not being suitable for modern elevators is the thickness of the motors. Another major reason for the disclosed configuration not being implementable is that the open structural portion of the U-shaped motor primary may incur buckling from inherently high attractive forces.

Therefore, none of the existing patents provide a practical alternative to current mechanically driven elevator door system.

DISCLOSURE OF THE INVENTION

It is an object of the present invention to provide a high performance system for opening and closing elevator car doors.

According to the present invention, an elevator car door system for opening and closing a first and a second elevator car doors includes a first moving motor primary fixedly attached onto a first door hanger from which the first door is suspended, a second moving motor primary fixedly attached onto a second door hanger from which the second door is suspended, and a stationary motor secondary attached to a header bracket secured to the elevator car. Each of the first and second moving motor primaries includes a primary winding and a backiron spaced apart from the primary winding by a spacer to define a magnetic air gap therebetween. The stationary motor secondary extends the length of the door travel and fits between the primary winding and the backiron within the magnetic air gap. The configuration of the present invention establishes a small and constant magnetic air gap that is critical for obtaining a high performance elevator car door system.

One major advantage of the present invention is that it provides a practical alternative to conventional mechanical linkages, thereby increasing the reliability of the door system, improving performance and reducing maintenance costs.

Another major advantage of the present invention is that it meets space and weight constraints. By placing a motor primary on each door hanger and by fixing the motor secondary to the car frame, the space envelope required for the door system is reduced. The door system of the present invention is also sufficiently thin to fit on the elevator car without encroaching on the elevator car space.

The foregoing and other advantages of the present invention become more apparent in light of the following detailed description of the exemplary embodiments thereof, as illustrated in the accompanying drawings.

BEST MODE FOR CARRYING OUT THE INVENTION

Figure 1:
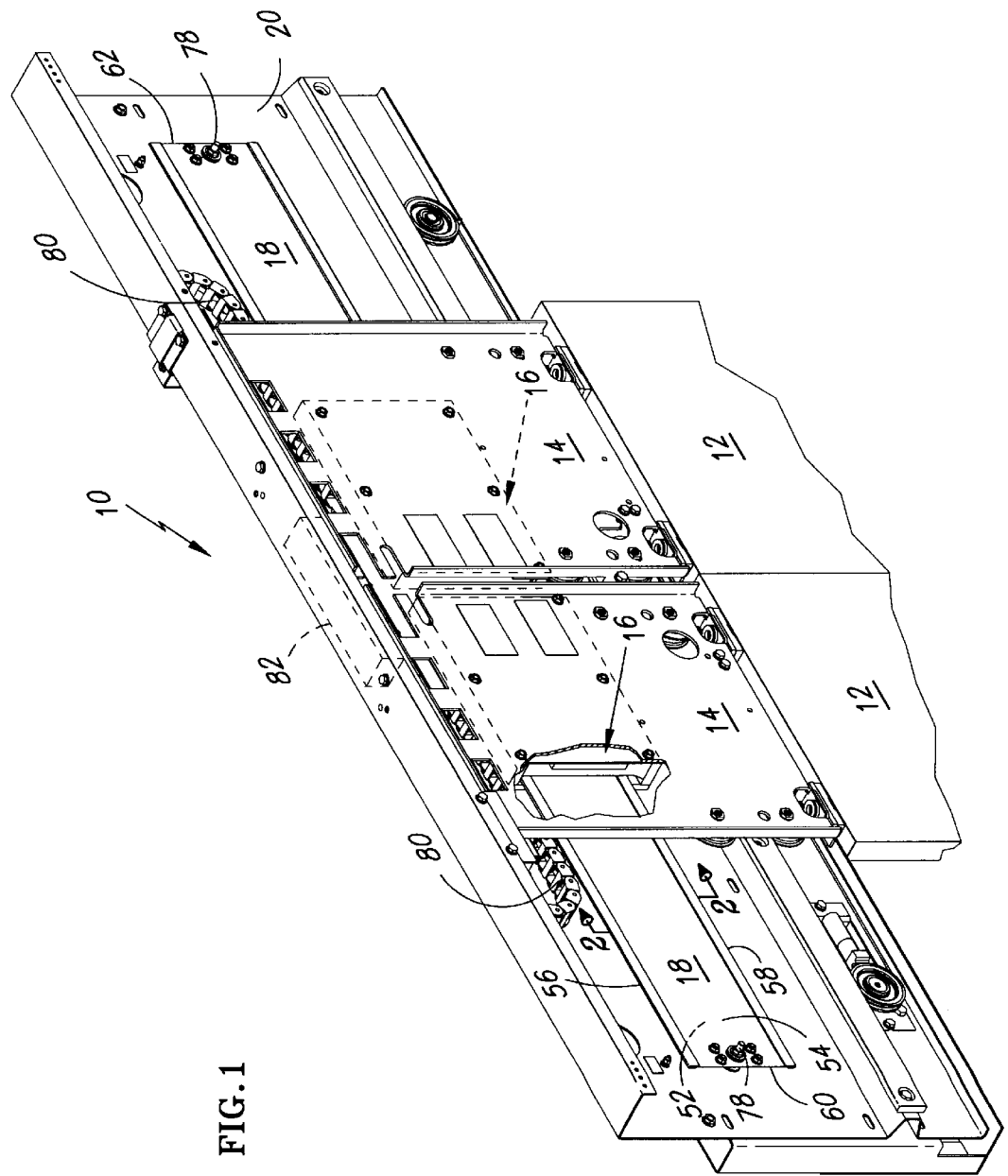
FIG. 1 is a cut-away, schematic, perspective view of an elevator door system driven by a linear induction motor, according to the present invention.

Referring to FIG. 1, an elevator car door operating system 10 for opening and closing a pair of elevator car doors 12 that are suspended from a pair of door hangers 14 includes a pair of moving motor primary subassemblies 16 fixedly attached to the pair of door hangers 14 and a stationary motor secondary 18 attached to a header bracket 20 secured to a car frame (not shown).

Figure 2:
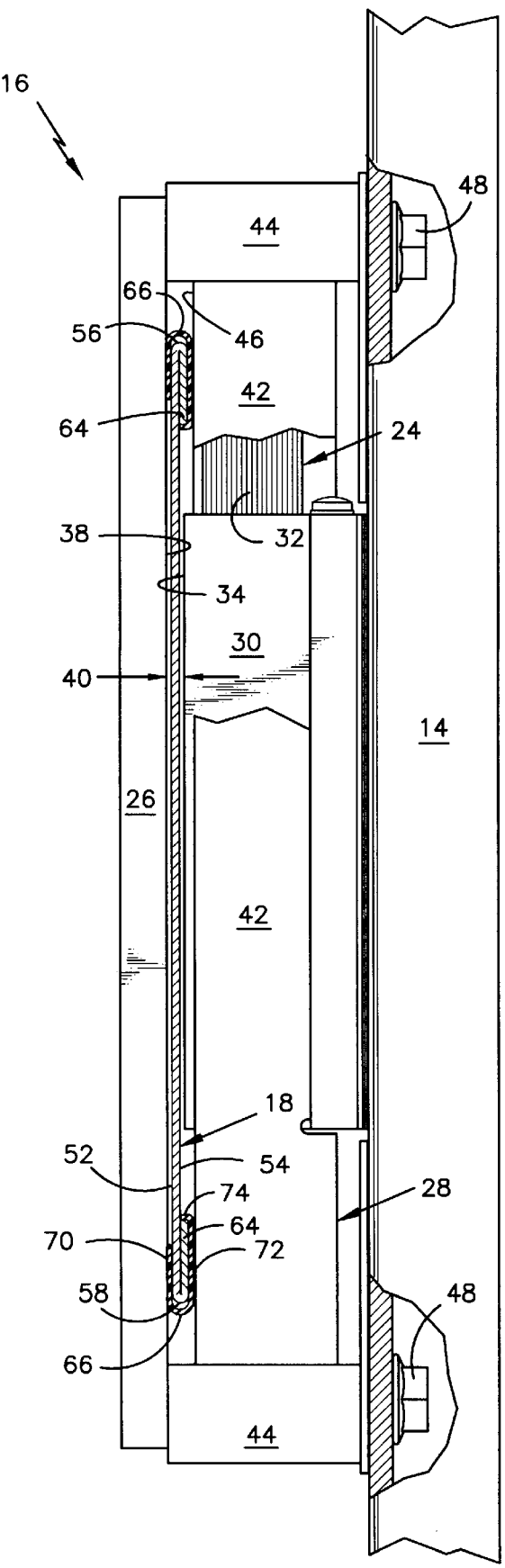
FIG. 2 is a schematic, cross-sectional view of the linear induction motor of FIG. 1 taken along the line 2—2.

Referring to FIG. 2, each of the moving motor subassemblies 16 includes a primary winding 24 and a backiron 26 spaced apart from the primary winding 24 by a plurality of motor spacers 28. The primary winding 24 includes a primary iron unit 30 with winding 32 wrapped about it and a primary surface 34 facing the backiron 26. The backiron 26 includes an iron plate having a backiron surface 38 facing the primary winding 24. A magnetic air gap 40 is defined between the primary surface 34 and the backiron surface 38.

Each spacer 28 includes a spacer bar 42 framed by a spacer head 44 on each end thereof. Each spacer head 44 fixes spacing between the primary winding 24 and the backiron 26. The spacer bar 42 of each spacer 28 has a spacer surface 46 facing the backiron 26. The spacer bar 42 is adapted to clamp the primary winding 24 against the door hanger 14. Each moving motor primary subassembly 16 is fixedly attached to the door hangers 14 by means of a plurality of bolts 48 passing through the backiron and the motor spacer heads 44. The length of each moving motor primary 16 does not exceed the width of each door hanger 14.

The stationary motor secondary 18 extends the length of the elevator car door travel and fits between the backiron 26 and the primary winding 24 as the moving motors 16 travel across, opening and closing the elevator car doors 12. The motor secondary 18 comprises a substantially flat plate having a first surface 52 and a second surface 54 bounded by a top and a bottom longitudinal edges 56, 58 extending the length of the motor secondary 18 and by a first and second vertical ends 60, 62, as best seen in FIG. 1. Each longitudinal edge 56, 58 is bent over to form a lip 64 along the length of the second surface 54 of the motor secondary 18. A secondary guide 66 is placed over each longitudinal edge 56, 58 of the motor secondary 18. The secondary guide 66 has an elongated U-shaped body, the internal width of which is equal to the doubled over longitudinal edge 56, 58 of the motor secondary. The U-shaped body includes a first leg 70 and a second leg 72 with the second leg having length substantially equaling the length of the bent over lip 64. The second leg 72 also includes a tab 74 integrally formed at the end thereof. The secondary guide 66 is snapped on each longitudinal edge 56, 58 of the motor secondary with the tab 74 fitting over the bent over lip 64 and securing the secondary guide 66 onto the motor secondary 18.

The outside surface of the first leg 70 of the secondary guide 66 comes in contact with the backiron surface 38. The outside surface of the second leg 72 of the secondary guide 66 comes in contact with the spacer bar surface 46. Each spacer 28 is dimensioned so that a running clearance is defined between the second surface 54 of the motor secondary 18 and the primary surface 34. The spacer bar surface 46 is indented from the plane of the primary 34 surface of the primary winding 24 to compensate for the thickness of the lip 64 of the motor secondary 18. Therefore, the running clearance between the backiron surface 38 and first surface 52 of the motor secondary 18 and between the primary surface 34 and the second surface 54 of the motor secondary 18 is established by the secondary guides 66 and equals the thickness of the first and second legs 70, 72 of the secondary guide 66, respectively.

The motor secondary 18 is movably attached onto the header bracket 20 at two ends 60, 62 thereof, as best seen in FIG. 1. The motor secondary is mounted on the header bracket 20 on a standoff 78 to allow the backiron 26 to travel between the header bracket 20 and the motor secondary 18. The standoff 78 also includes a swivel joint allowing the motor secondary 18 to move in and out of plane and to rotate about the joint 78.

The door system 10 also includes a pair of moving flexible cables 80 and a termination box 82 attached to the header bracket 20, as best seen in FIG. 1. Each cable 80 attaches to the termination box 82 on one end thereof and to the respective motor primaries 16 on the other end thereof.

In operation, the moving flexible cables 80 transmit energy from the termination box 82 to the respective motor primaries 16. As each motor primary 16 travels across the motor secondary 18, the end of the flexible cable attached to the motor primary travels therewith. The winding 30 of the motor primary 16 is energized and produces a magnetic field across the primary surface 34 of the motor primary. The magnetic field induces current in the motor secondary 18 and also travels through the backiron 26. Magnetic forces generated within the motor secondary 18 react with the magnetic field created by the motor primary 16 and result in a thrust force from the motor primary 16 to the motor secondary 18, thereby opening and closing the elevator car doors 12.

The present invention ensures that the magnetic air gap 40 is constant and relatively small throughout operation of the door system. The magnetic air gap remains constant during operation of the door system because first, the configuration of the present invention has the backiron 26 traveling with the primary winding 24. Second, the motor spacers 28 ensure that the magnetic air gap does not vary as the backiron 26 and primary winding 24 travel across the motor secondary 18. The size of the magnetic air gap is determined by the thickness of the motor secondary 18 and the running clearances. The magnetic air gap 40 is minimal in the configuration of the present invention because the motor secondary is a very thin plate of copper and because the running clearances between the motor secondary 18 and motor primary 16 are minimal. A small and constant magnetic air gap ensures high efficiency and consistency in performance of the motor. For example, in the best mode embodiment the thickness of the copper plate of the motor secondary is approximately one and a half millimeter (1.5 mm).

The running clearances between the backiron 26 and the motor secondary 18 and between the motor secondary 18 and the primary winding 24 are established by the secondary guides 66 and are maintained constant and small without causing friction and wear between the moving and stationary motors. Small and constant running clearances are achieved without requiring costly precision machining for high tolerances and ensure a small and constant magnetic gap. For example, the running clearance on each side of the motor secondary is approximately one millimeter (1 mm).

When the doors 12 open and close, the swivel joints 78 allow the motor secondary 18 to move in many dimensions and compensate for possible misalignment or impact of the doors 12. If the door 12 is either misaligned or impacted, such misalignments and impacts are transmitted to door hangers 14 and also to the motor primaries 16 that are fixedly attached to the door hangers 14. When the motor primary 16 moves in and out of plane or is slightly rotated, the stationary motor secondary 18 also moves about the swivel joints 78 so that the running clearances are maintained constant.

A major advantage of the present invention is that it eliminates the need for a rotary motor and mechanical linkages, thereby significantly reducing maintenance costs associated with misalignment and periodic readjustments of the linkages. A linear induction motor of the present invention also provides superior and much smoother operation of the doors.

The primary advantage of the present invention is that it provides not only a high performance, high efficiency linear induction motor door opening system for elevator cars, but also a practical and economical one. Although the prior art shows some configurations of linear motors on doors in general, none of those prior art references, separately or in combination, provide a practical and economical solution to conventional mechanical linkage door systems.

An additional advantage of the present invention over the prior art is that is does not violate the space constraints. First, the configuration of the present invention does not enlarge the space envelope required for the door system. Second, this particular configuration allows the motor to be sufficiently thin to be placed and used for door systems without encroaching on the elevator car space.

Another advantage of the present invention over the prior art is its cost effectiveness. Use of linear induction motors, rather than permanent magnet motors, makes the door system affordable. Also, use of a small motor primary, having a single winding unit, maintains a reasonable price for the door system. Both of these attributes of the present invention also reduce the weight of the system.

While the present invention has been illustrated and described with respect to a particular embodiment thereof, it should be appreciated by those of ordinary skill in the art, that various modifications to this invention may be made without departing from the spirit and scope of the present invention. For example, although the best mode embodiment of the present invention depicts a center opening-by-parting door system, a single slide door system is possible using a single motor primary. Also, the best mode describes the motor secondary as a thin conductive plate of copper. Other conductive metals can be also used for fabricating the motor secondary. Additionally, the backiron of motor primary can be replaced by another winding.

We claim:

1. An elevator car door operating system for opening and closing an elevator car door in an elevator system includes a door hanger for suspending said elevator car door therefrom, said door hanger being movably secured onto a header bracket attached to an elevator car, said elevator car door operating system comprising:

a motor primary unit fixedly attaching onto said door hanger, said motor primary unit including a primary winding spaced apart from a backiron by means of a plurality of spacers and defining a constant magnetic gap therebetween; and a motor secondary extending the length of the door travel of said elevator car door and fitting between said primary winding and said backiron, said motor secondary having a first vertical end and a second vertical end and a top and a bottom longitudinal edges.

2. The elevator car door operating system according to claim 1 wherein said motor secondary is fabricated from a conductive metal.

3. The elevator car door operating system according to claim 2 wherein said conductive metal is copper.

4. The elevator car door operating system according to claim 1 wherein said motor secondary being movably attached onto said header bracket at said first and said second vertical ends.

5. An elevator car door operating system for opening and closing a first elevator car door and a second elevator car door in an elevator system includes a first door hanger and a second door hanger for suspending said first and said second elevator car doors therefrom, said first and said second door hangers being movably secured onto a header bracket attached to an elevator car, said elevator car door operating system comprising:

a first motor primary unit fixedly attaching onto said first door hanger, said first motor primary unit including a first primary winding spaced apart from a first backiron by means of a first plurality of spacers;

a second motor primary unit fixedly attaching onto said second door hanger, said second motor primary unit including a second primary winding spaced apart from a second backiron by means of a second plurality of spacers; and a motor secondary being a substantially flat plate extending the length of the door travel of said first and said second elevator car doors and fitting between said first primary winding and said first backiron and between said second primary winding and said second backiron.

* * * * *